(12) United States Patent
Lotspiech et al.

(10) Patent No.: US 7,711,114 B2
(45) Date of Patent: May 4, 2010

(54) SYSTEM AND METHOD FOR ASSIGNING SEQUENCE KEYS TO A MEDIA PLAYER TO ENABLE FLEXIBLE TRAITOR TRACING

(75) Inventors: Jeffrey Bruce Lotspiech, Henderson, NV (US); Hongxia Jin, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1096 days.

(21) Appl. No.: 11/231,174

(22) Filed: Sep. 19, 2005

(65) Prior Publication Data

US 2007/0174637 A1    Jul. 26, 2007

(51) Int. Cl.
*G06F 21/00*    (2006.01)
(52) U.S. Cl. .................... 380/201; 380/277; 726/27
(58) Field of Classification Search ........... 380/200, 380/201, 277; 713/150, 155, 156, 168, 173, 713/175, 182, 183, 185
See application file for complete search history.

(56) References Cited

U.S. PATENT DOCUMENTS

| | | | | |
|---|---|---|---|---|
| 4,491,725 | A | * | 1/1985 | Pritchard ........................ 705/2 |
| 5,832,447 | A | * | 11/1998 | Rieker et al. .................... 705/2 |
| 6,285,774 | B1 | | 9/2001 | Schumann et al. |
| 6,556,679 | B1 | | 4/2003 | Kato et al. |
| 2002/0076205 | A1 | | 6/2002 | Asada et al. |
| 2002/0133701 | A1 | | 9/2002 | Lotspiech et al. |
| 2002/0141582 | A1 | | 10/2002 | Kocher et al. |
| 2002/0159593 | A1 | | 10/2002 | Sako et al. |
| 2003/0169885 | A1 | | 9/2003 | Rinaldi |
| 2003/0212642 | A1 | * | 11/2003 | Weller et al. ................... 705/67 |
| 2004/0034787 | A1 | | 2/2004 | Kitani |
| 2004/0111611 | A1 | * | 6/2004 | Jin et al. ...................... 713/163 |
| 2004/0128259 | A1 | | 7/2004 | Blakeley et al. |
| 2004/0133794 | A1 | | 7/2004 | Kocher et al. |
| 2004/0153941 | A1 | | 8/2004 | Muratani |
| 2005/0141704 | A1 | | 6/2005 | Van Der Veen |

OTHER PUBLICATIONS

Traitor Tracing for Prerecorded and Recordable Media, Hongxia Jin et el., DRM'04 Oct. 25, 2004, Washington DC, USA, Copyright 2004 ACM, 1-58113-969-1/04/0010.*
Hongxia Jin et al., "Traitor Tracing for Prerecorded and Recordable Media," ACM, DRM'04, Oct. 25, 2004, pp. 83-90.

(Continued)

*Primary Examiner*—Gilberto Barron, Jr.
*Assistant Examiner*—Simon Kanaan
(74) *Attorney, Agent, or Firm*—Samuel Kassatly; Shimokaji & Associates P.C.

(57) ABSTRACT

A traitor tracing enabling system assigns sequence keys to a media player to enable better tracability with fewer actual variations in the content. The system comprises a technique for increasing a number of sequence keys, allowing a finer granularity in a traitor tracing process with little increase in sequence key storage or in bandwidth required to transmit sequence keys to a media player. The present system comprises a variation table which maps the sequence keys to the individual variations in the file, such that multiple sequence keys can be mapped to a single variation.

20 Claims, 5 Drawing Sheets

OTHER PUBLICATIONS

Fernandez-Munoz et al., "Fingerprinting Schemes for the Protection of Multimedia Distribution Rights," Upgrade, Security in e-Commerce, v.III, n.6, pp. 36-40, Dec. 2002, http://www.cepis-upgrade.org/issues/2002/6/upgrade-vIII-6.pdf.

Silverberg et al., "Applications of List Decoding to Tracing Traitors," a version of this paper appeared in ASIACRYPT 2001, 2001, http://www.math.unl.edu/~jwalker/papers/taipp.pdf.

Lin et al., "Advances in Digital Video Content Protection," Proc. of the IEEE, v.93, n.1, pp. 171-183, Jan. 2005, http://shay.ecn.purdue.edu/~linet/Papers/IEEE-Proc-2005.PDF.

Kocher et al., "Self-Protecting Digital Content," Technical Report from the CRI Content Security Research Initiative, Cryptography Research, Inc. (CRI), 2002-2003, http://www.cryptography.com/resources/whitepapers/SelfProtectingContent.pdf.

* cited by examiner

SYSTEM AND METHOD FOR ASSIGNING SEQUENCE KEYS TO A MEDIA PLAYER TO ENABLE FLEXIBLE TRAITOR TRACING

FIELD OF THE INVENTION

This invention relates to preventing piracy of digital content in a broadcast encryption system and more specifically to tracing a traitor that may be colluding to redistribute such content or related decryption keys.

BACKGROUND OF THE INVENTION

The widespread transition of data from analog format to digital format has exacerbated problems relating to unauthorized copying and redistribution of protected content. Flawless copies of content can be readily produced and distributed via the Internet. This piracy is a major concern and expense for content providers.

Further, a new type of home consumer device for digital content management has been enabled by the advent of inexpensive, large-capacity hard disks. A movie rental box receives digital movies from some inexpensive source of data, usually a broadcast source (whether terrestrial or satellite-based). The movies do not have to be delivered in real time. Instead, they are stored on the hard disk, so that at any moment the hard disk contains, for example, the hundred hottest movies in the rental market. The consumer can simply select a particular movie and hit "play" to begin viewing a movie. The movie rental box periodically calls a clearing center and reports the content usage of the consumer for billing purposes; the box may also acquire new decryption keys during this call.

This approach to content distribution is a one-to-many type of distribution system such as, for example, distribution of pre-recorded or recordable media, a pay-per-view TV system, etc. The advantages the box provides to the consumer are obvious: he or she no longer has to go to the video rental store, and does not have to return a rental tape or DVD. The consumer value proposition of movie rental boxes is so compelling it is estimated that there will be 20 million such boxes in the United States within five years.

Content providers need to know what security problems are associated with these boxes, i.e. how can a user get a movie without paying for it? The simple attack of merely disconnecting the box so that it cannot call the clearing center can achieve only a short-lived advantage because the clearing center can simply refuse to provide new decryption keys to such a box. Likewise, the periodic "calling home" makes detection of clone boxes relatively easy.

A serious attack is likely to be the so-called "anonymous" attack, wherein a user or a group of users purchase rental movies from legitimate movie rental boxes that have been instrumented so that the protected content or the decryption keys can be captured and redistributed, often over the Internet. This "Napster-style" attack focused on movies instead of music is the most urgent concern of the movie studios that are investigating content protection technology.

One solution to the problem is to differently watermark and differently encrypt each movie for each authorized movie rental box, so that if a movie were pirated the watermarking and encryption information can uniquely identify the compromised box. However, this solution is not feasible because of the excessive computing effort and transmission bandwidth required to prepare and transmit individualized movies. The distribution system is economical only if the movies can be distributed over broadcast channels, i.e., every box gets substantially the same data at the same time.

To solve the broadcast problem, the approach known in the art as "traitor tracing" is used. In this conventional approach, an original version of each movie file is augmented before being broadcast. Specifically, the file that is actually broadcast has at least one critical file segment replaced by a set of segment variations. Each file segment variation is differently encrypted before encryption, or differently encrypted and watermarked before encryption. The entire file may also be watermarked. All the variations in one segment are identical for viewing purposes. A receiver is given the cryptographic key to decrypt only one of the variations in each segment. If the receiver is compromised and is used to illegally rebroadcast either the keys or the segments themselves, it is possible to deduce which receiver or receivers have been compromised.

Although this technology has proven to be useful, it would be desirable to present additional improvements. The traitor-tracing approach has not been widely used in practice to date, because previously known methods required unreasonable amounts of bandwidth in the broadcast, due to the number of segments or variations required.

One conventional solution using a traitor-tracing approach equips authorized users with security devices that can decode content; unauthorized clients do not have decoding capabilities. A traitor detection system generates different decoding capabilities and creates a file that associates the decoding capabilities with specific authorized clients. In the event an authorized user illicitly transfers content to an illegitimate user, this conventional approach consults the association file to identify one or more of the authorized clients associated with the illicitly transferred decoding capabilities.

Although this technology has proven to be useful, it would be desirable to present additional improvements. This approach requires a broadcaster to dynamically change the segment variations assigned to the individual receivers "on the fly", based on instantaneous feedback on the re-broadcasted data. This conventional approach is not useful for applications such as rental movie boxes, because the pirate has no urgent need to immediately rebroadcast the movies. For example, the pirate can wait for months without losing substantial revenue, if that helps the pirate defeat a traitor-tracing scheme.

Another conventional approach comprises a traitor-tracing scheme against re-digitization and anonymous attacks. This conventional approach assigns codes to variations of content; the assigned codes are similar to error-correcting codes. The content typically comprises 255 different movie sequences, each movie having 256 variations. After 255 movies, the assignment repeats.

By adding a level of indirection, each media player needs to store only 255 keys, corresponding to the 255 movies in the sequence; each of these 255 keys is referred to a "sequence key". The assignment of these keys is based on the "outer code" of this conventional approach, corresponding to a sequence of 255 movies. Each sequence key in the sequence of 255 movies has 256 versions, corresponding to the 256 movie versions. Each media player has the 255 sequence keys, installed when the media player is manufactured.

It might be beneficial to consider the sequence keys as being organized in a matrix. In the example above, the matrix would have 255 columns, one for each movie in the sequence, and would have 256 rows, one for each movie version. A given media player would have exactly one sequence key in each column. Which row each key would have would be set by the outer code.

To continue with the example, when requested to play a movie, the media player determines which sequence number the movie is using, 0 to 255. The sequence number is stored on the movie disc. For an exemplary sequence number 44, the media player combines a sequence key #44 stored on the media player with cryptography values comprising a media key in use on the disc to calculate a movie unique key. The media player knows the version of the sequence key #44 stored on the media player. For exemplary purposes, a version #141 of sequence key #44 is stored on the media player. The media player then uses sequence key to decrypt version #141 of the movie.

Although this technology has proven to be useful, it would be desirable to present additional improvements. The traceability of this approach is partially dependent on the number of variations per segment. Larger numbers of variations per segment provide improved traceability. The selection of the number of variations per segment is affected by watermarking efficiency and the bandwidth allowed by the application scenario. For example, choosing 256 variations per movie where the segments where the variations exist comprise a 2 second scene requires about 5-10% extra bandwidth. The small number of variations chosen due to these restrictions partially adversely affects the traceability of the scheme.

In a re-digitization attack, attackers redistribute the decrypted clear content. However, in an anonymous key attack, attackers simply redistribute the decryption keys for the content. The key attack is considered the more likely attack against the encrypted content. When the attack is redistributing the decryption key, watermark robustness and extra bandwidth are irrelevant. For every recovered movie with q variations, a traitor trace can trace the attack to 1/q of the population, assuming a single user initiated the attack. Higher values of q provide improved traceability. However, higher values of q require additional storage and bandwidth. Thus, an improved traceability for detection of a source of a key attack is desirable that enables a larger number of effective movie variations.

What is therefore needed is a system, a computer program product, and an associated method for assigning sequence keys to a media player which achieves higher effective traceability with fewer actual variations in the content. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for assigning sequence keys to a media player to enable more effective traitor tracing.

In a preferred embodiment, the present system assigns sequence keys to an individual content file in order to enable traitor tracing. the present system identifies variations that are supported by the content file is capable of supporting. It assigns one or more sequence keys to each variation, and generates a variation table for mapping each sequence key to each variation. Each entry in the variation table contains a variation that has at least one corresponding assigned sequence key. The present system encrypts each entry in the variation table with a value associated with the corresponding assigned sequence key.

The present system comprises a technique for increasing the number of sequence keys without requiring a substantial increase in storage or bandwidth. This increase in number of sequence keys allows a finer granularity in a traitor tracing process. The present system further comprises a level of indirection in the form of a sequence key matrix for reduces the number of actual variations in the content. For example, the sequence keys may be increased by a factor of four from 256 to 1024. The present system provides the additional sequence keys with a minimal increase in sequence key storage or bandwidth or storage required to transmit sequence keys and content variations to a media player.

The sequence key matrix comprises a predetermined number of rows such as, for example, 1024 rows. To generate 256 variations of a key from 1024 different sequence keys, the present system uses an array to index four sequence keys into a variation key $K_d$ used to encrypt a table which is also referred to herein as variation table. The key $K_d$ is encrypted with the sequence key, or a derivative of it. The 256 keys $K_d$ for each table can be randomly generated.

The present system enables additional flexibility, allowing the 256 content versions to accommodate an outer code that generates more than 256 versions. System 10 achieves improved traceability with little added cost. Each media player stores, for example, only 255 sequence keys. Additional overhead is required to store the variation table; this overhead is negligible compared to the size of a content file like a high-definition movie.

The present system provides a file sequence with a higher number of file versions without requiring an increase in the number of sequence keys in each media player. Traitors may know which sequence key (which column in the sequence key matrix) is used for each file. Columns are repeated after, for example, 255 files. Traitors may attempt to use the same variation in a new file that was previously used in an older file at the same point in the sequence (or column). However, the present system reshuffles the grouping of, for example, four sequence keys to each variation. Even if traitors are careful to use the same sequence key in the same column in the new sequence, some tracing information is revealed. In particular, which of the possible four sequence keys the traitors had in the first sequence is revealed.

The present system improves overall resistance to attacks by traitors. Each time a traitor redistributes keys, fewer keys remain in the present system for use. When a sufficient number of keys are exposed, the system is broken. Suppose files are being randomly attacked; this can be modeled as a Bernoulli trial. A simple combinatorial analysis shows that q log(q) files are required to expose all q versions of keys in each column in the sequence key matrix with high probability. Consequently, a system comprising a higher number of key versions can survive against attacks longer.

The present system may be embodied in a utility program such as a traitor-trace enabling utility program. The present system also provides means for the user to identify a file for encryption and a media device for receiving the encrypted file. The present system provides means for the user to invoke the traitor-trace enabling utility program to encrypt the file such that theft of encryption keys or unauthorized distribution of the file can be traced to the media device.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
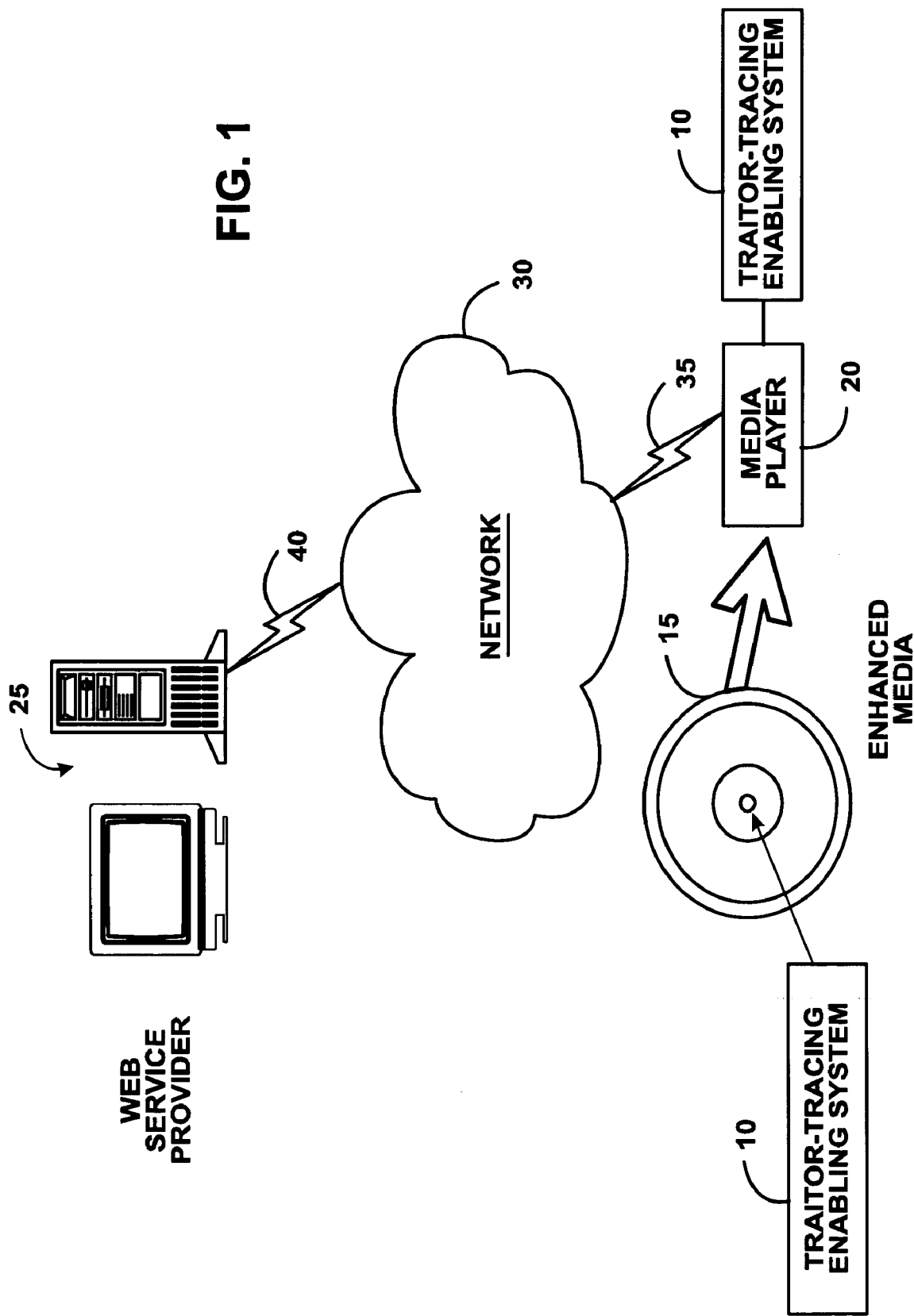
FIG. 1 is a schematic illustration of an exemplary operating environment in which a traitor-trace enabling system of the present invention can be used.

FIG. 1 portrays an exemplary overall environment in which a system, method, and service for assigning sequence keys to a media player to enable flexible traitor tracing (the "traitor-tracing enabling system 10" or the "system 10") according to the present invention may be used. System 10 comprises a software programming code or a computer program product that is typically embedded within, or installed on a media 15 and a media player 20. Alternatively, system 10 can be saved on a suitable memory or storage medium such as a diskette, a CD, a DVD, a hard drive, or like devices.

The media player 20 can access a web service provider 25 through a network 30. The media player 20 comprises software that allows the media player 20 to interface securely with the web service provider 25. The media player 20 is connected to network 30 via a communications link 35 such as telephone, cable DSL, satellite link, etc. The web service provider 25 is connected to the Internet through a communications link 40. The media player 20 downloads content from the web service provider 25 and records the content on the media 15. Alternatively, media 15 may be pre-recorded with content such as, for example, movies, audio files, computer programs, or any other type of electronic file. Media 15 may be played on the media player 20. Content on media 15 comprises one or more files.

Figure 2:
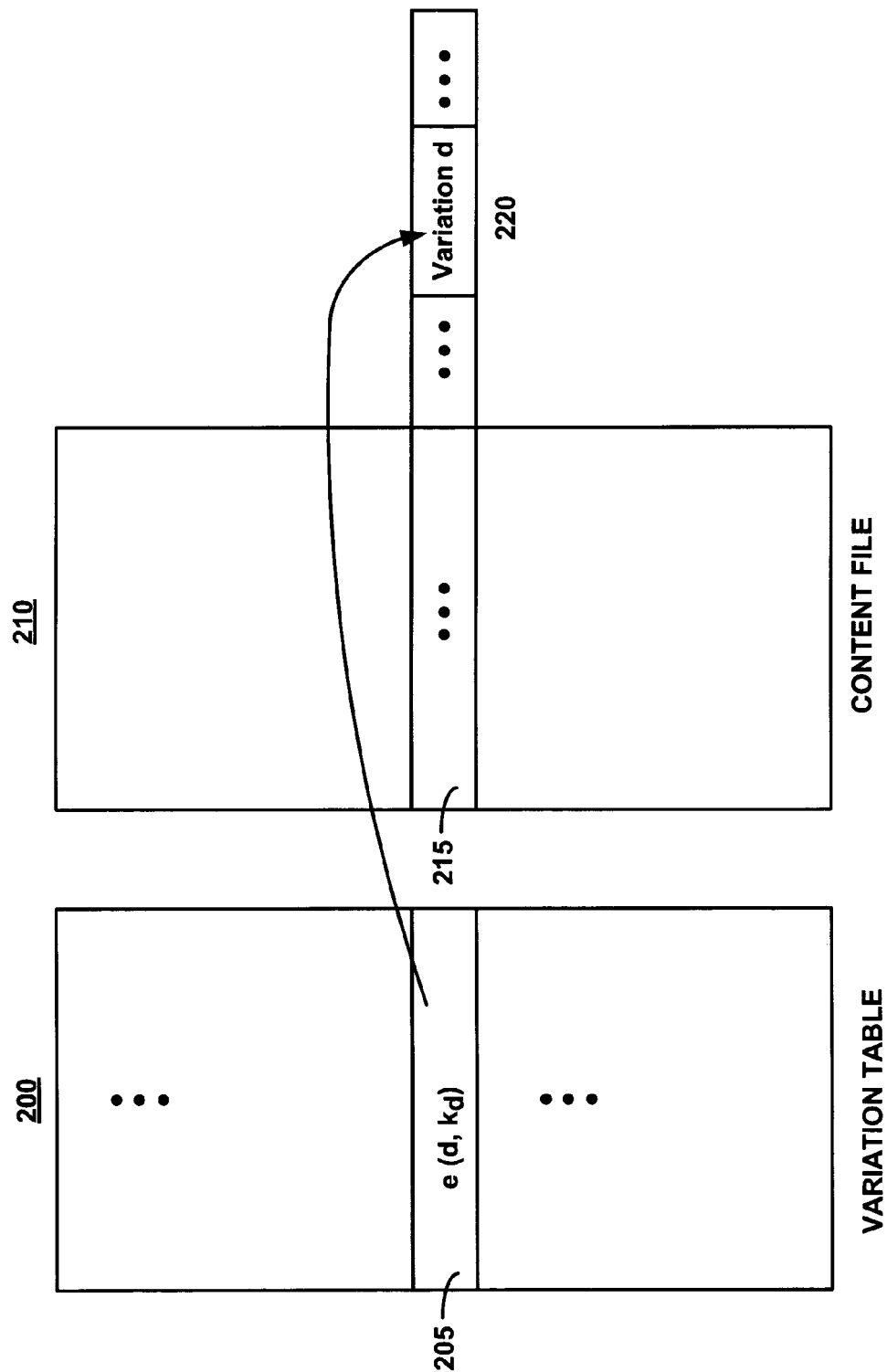
FIG. 2 is a schematic illustration of the variation table.

FIG. 2 shows the use of the variation table 200. The variation table 200 is associated with a content file 210, for example, it might be stored on the same disc as the content file. Like the content file it is associated with a single column in the sequence key matrix, for example, a single movie in a movie sequence. The variation table 200 has a number of entries equal to the number of rows in the sequence matrix. Each entry is encrypted with the corresponding sequence key.

An entry 205 in the variation table 200 contains an encryption of the variation number d and a variation key $K_d$ that allows the media player 20 to decrypt the particular variation. The variation number d is not confidential so it is also possible for it to remain unencrypted in the table.

In the content file 210 there is a critical segment 215 which contains the points of variation. The media player 20 uses the sequence it has in this column to decrypt the variation number d and a variation key $K_d$. It uses $K_d$, or a derivative of it, to decrypt variation d 220 in the content file. It is not able to decrypt any other variation. If the media player 20 has been compromised and is being used to distribute unauthorized copies, those unauthorized copies must contain variation 220.

Figure 3:
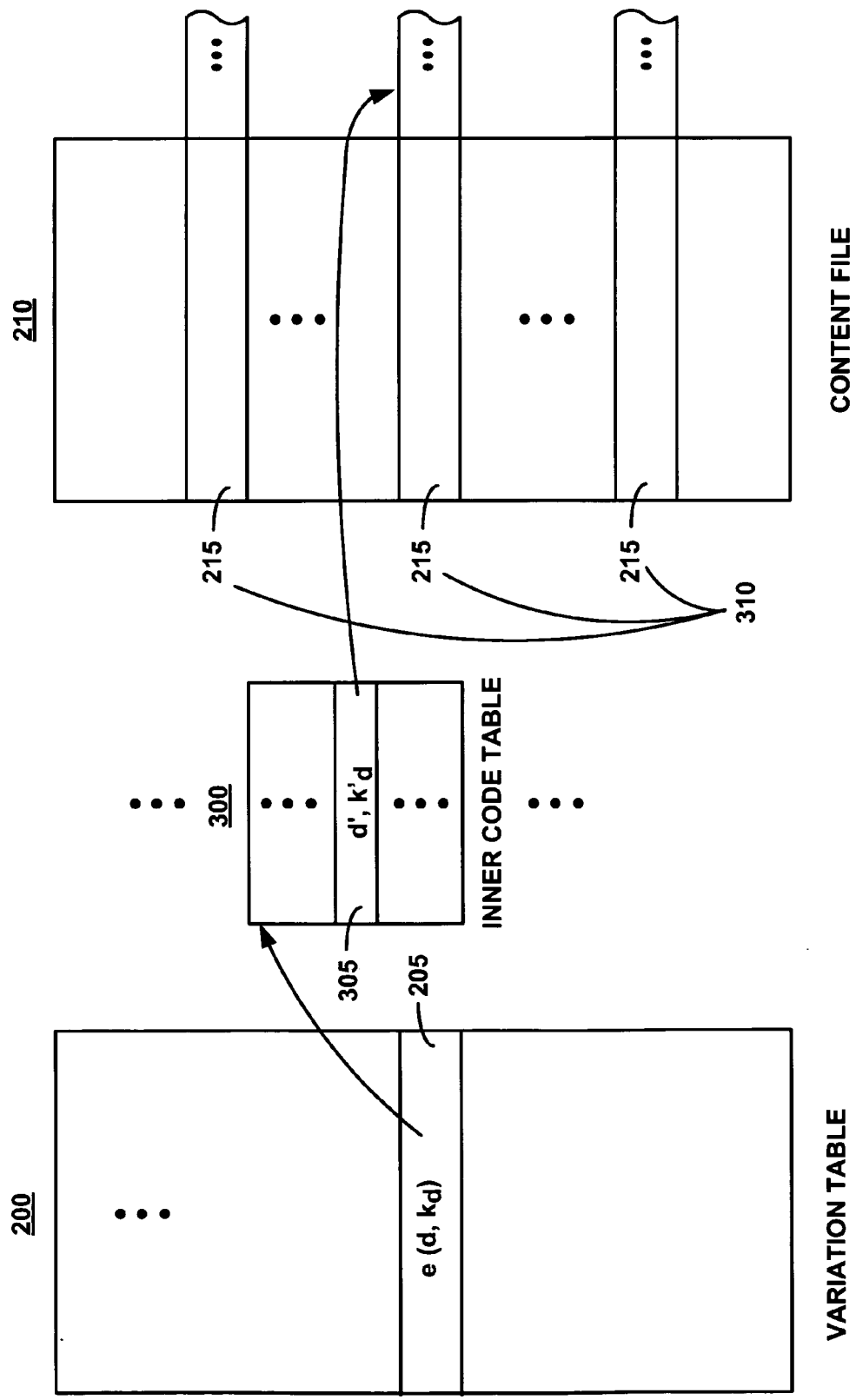
FIG. 3 is a schematic illustration of critical segments contained in a content file.

For clarity of explanation, FIG. 2 shows a single critical segment 215. In a preferred embodiment disclosed in U.S. application Ser. No. 11/231,174 filed concurrently herewith and titled "System and Method for Assigning Sequence Keys to a Media Player to Enable Hybrid Traitor Tracing", which is incorporated herein by reference in its entirety, the content file 210 actually contains multiple critical segments. This is shown in FIG. 3, where the critical segments are collectively labeled 310. In this case, the variations in the content are actually the result of a code of the particular variations of the critical segments 310. This code is referred to as the inner code. In this embodiment, there is an inner code table 300.

The inner code table 300 has one entry for each critical segment 215 in the file 210. A single entry 305 contains a variation number d' and a variation key $K'_d$ that instructs the video player which variation to use at that critical segment, and allows it to decrypt it.

An inner code table 300 is itself encrypted with one of the variation keys $K_d$ from the variation table 200. Thus there are many inner code tables 300, and they are numbered, so the media player can determine which one to use after decrypting its entry 205 in the variation table 200.

It is possible to combine the inner code tables 300 and the variation table 200 into a single table. This increases the storage requirement but decreases the processing requirement for the media player 20. Both effects are minor, and both solutions are within the scope of this invention.

Figure 4:
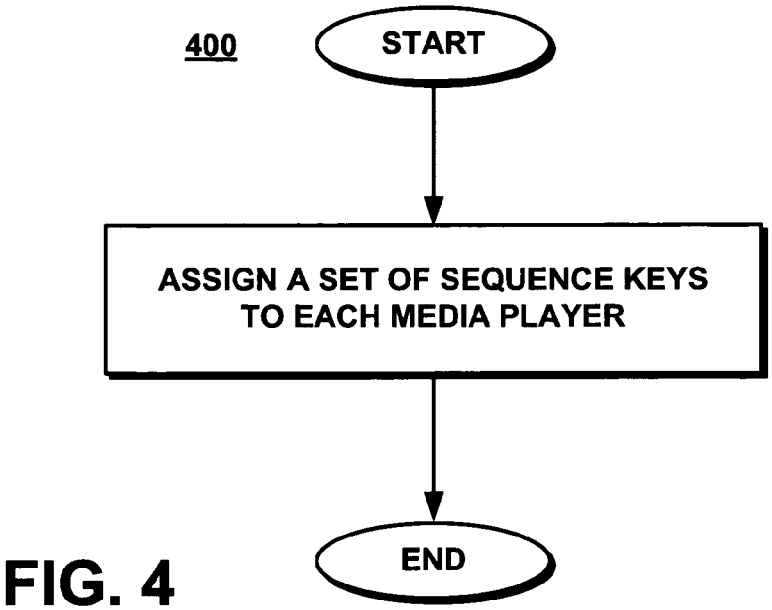
FIG. 4 illustrates a method of assigning an outer super code to sequence keys.

FIG. 4 illustrates a method 400 of system 10 in assigning an outer code to the sequence keys. In other words, it is the method that sets up the system and initializes the media players 20. The sequence keys may be assigned to media player 20 randomly, or they may be assigned as part of a systematic code. For example, the sequence key code (the outer code) can be a Reed-Solomon code. In a Reed-Solomon code, if q is the alphabet size, $n \leq q-1$ is the length of the code. If k is the source symbol size for the code, then the Hamming distance is $d = n-k+1$ and the number of codewords is $q^k$. For example, the parameters for the outer code can comprise $q=1024$, $n_2=255$, and $k_2=3$, thus the Hamming distance is $d_2=253$. The number of codewords in the outer code for this example is $1024^3 = 1,073,741,824$. Consequently, this example can accommodate more than one billion subscribers.

Figure 5:
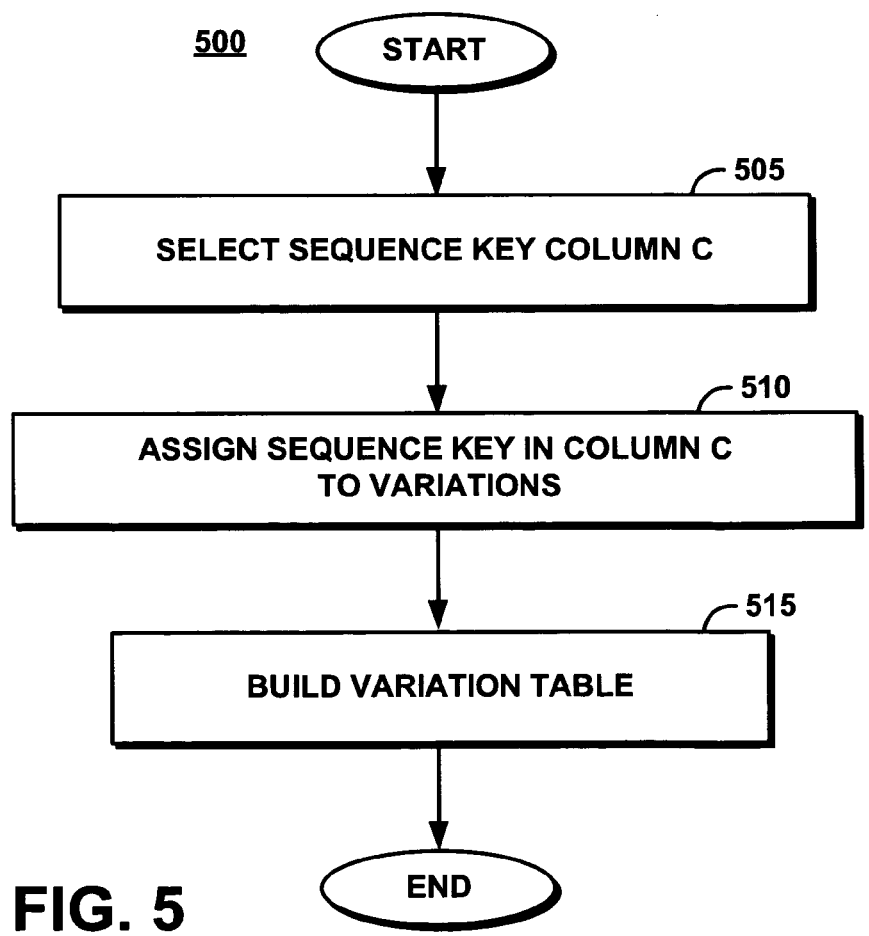
FIG. 5 illustrates a method of assigning sequence keys to the variations in an individual content file.

FIG. 5 illustrates a method 500 of system 10 of assigning sequence keys to the variations in an individual content file. In step 505, a sequence column C is selected. Any method of selection is acceptable, including random selection; however, tracing is maximized if the recovered unauthorized content files come from as many different columns as possible.

In step 510, the sequence keys in column C are assigned to the variations in the content file. If the number of sequence keys in column C equals the number of variations, this is easy. However, in general, there are fewer variations than there are sequence keys. The sequence keys must be grouped together, so that many sequence keys are associated with a single variation. Are methods of grouping are acceptable, including random. However, an authorized content file has already been recovered using column C, it will be known that the attackers have at least one in a set of sequence keys. It is useful, in this case, to assign every key in that set to a different variation.

In step 515, the variation table 200 is built based on the decisions made in step 510. Method 500 is repeated for each content file produced by the system.

Figure 6:
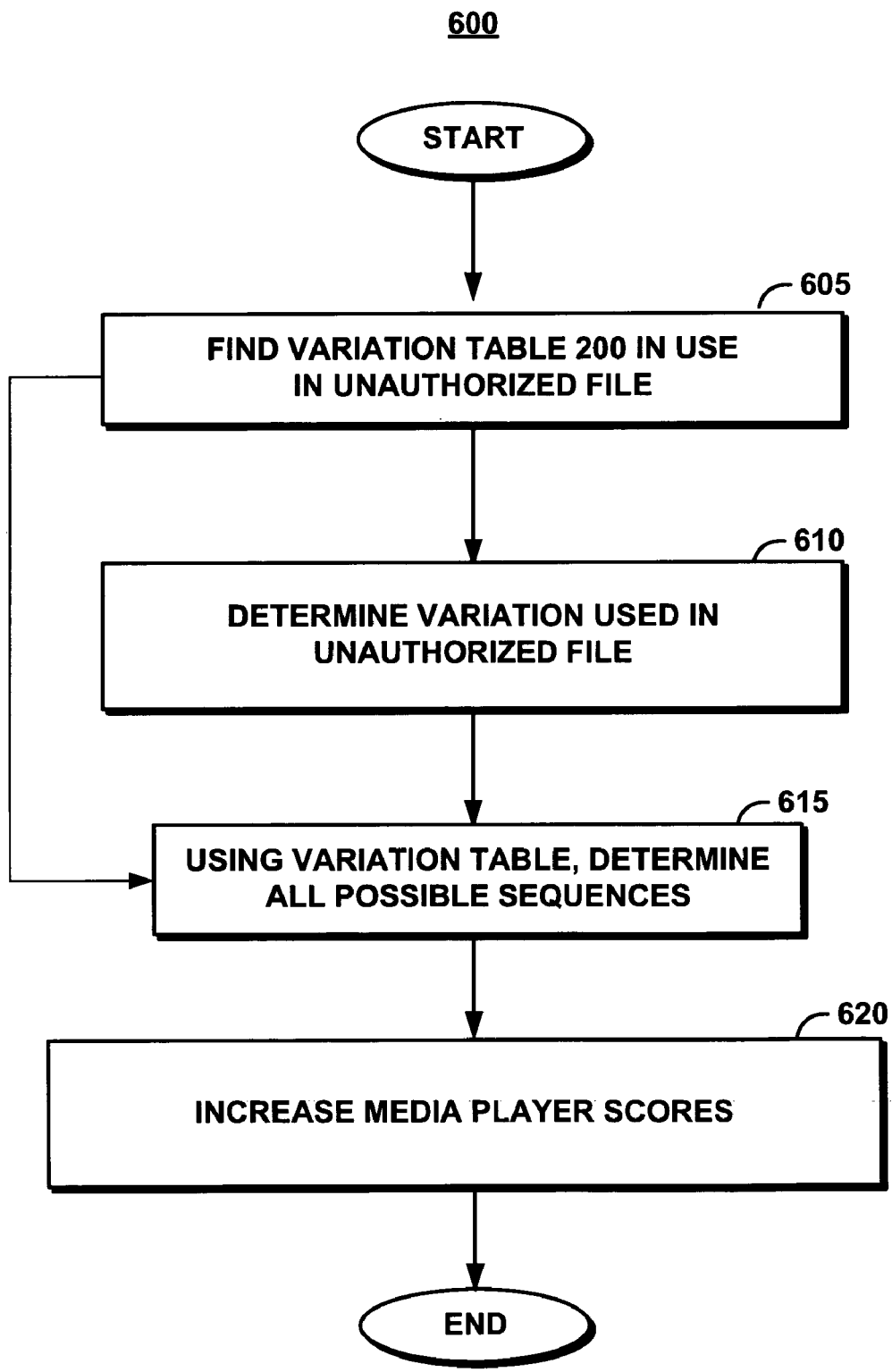
FIG. 6 illustrates a method of tracing back to compromised players based on recovered unauthorized content files.

FIG. 6 illustrates a method 600 of system 10 of tracing back to compromised players based on recovered unauthorized content files. In step 605, an unauthorized file has been recovered. The variation table 200 that was created by the method 500 when the file was created is selected.

In step 610, the variation used in the unauthorized file is determined. This might, for example, require a watermark detection. In step 615, the set of sequence keys that could have produced that variation are determined using the variation table 200 found in step 605.

In step 620, the scores of all media players that have one of the sequence key found in step 615 are increased. A well-known tracing traitors algorithm is to simply score every player against every unauthorized copy recovered, based on whether or not that player could have produced that unauthorized copy. If sufficient copies are recovered, guilty players likely have high scores, all innocent players likely have low scores.

In a key-based attack, where the attackers are distributing the sequence keys themselves, steps 605-615 are unnecessary.

It is to be understood that the specific embodiments of the invention that have been described are merely illustrative of certain applications of the principle of the present invention. Numerous modifications may be made to the method for assigning sequence keys to a media player to enable flexible traitor tracing described herein without departing from the spirit and scope of the present invention.

Moreover, while the present invention is described for illustration purpose only in relation to files transmitted to a media player, it should be clear that the invention is applicable as well to, for example, to any one-to-many technique for distributing a file to a user. Furthermore, while the present invention is described for illustration purpose only in relation to files, it should be clear that the invention is applicable as well to, for example, any kind of digital data sequence, including but not limited to text, audio, images, video, music, files, multimedia presentations, operating systems, software applications, and cryptographic keys.

What is claimed is:

1. A method of assigning sequence keys to a content file, to enable tracing, comprising:
   identifying one of a plurality of first sequence numbers and one of a plurality of first sequence keys for a content file;
   identifying a number of first content file variations the content file is capable of supporting by processing with a computer processor on a computer;
   assigning a variation number and one or more of the first sequence keys and one or more of the first sequence numbers to each of the first content file variations;
   assigning an outer code to the first sequence keys;
   generating a variation table having a plurality of entries, the variation table for mapping the first sequence keys to the first content file variations;
   wherein a first entry in the variation table contains one of the first content file variations corresponding to at least one of the first sequence keys;
   encrypting a first variation number and storing the first variation number in the variation table;
   identifying a critical segment which contains some of the first content file variations;
   creating an inner code table with an entry for the critical segment;
   encrypting the inner code table with a variation key from the variation table;
   encrypting the first entry in the variation table with a value associated with the corresponding assigned one of the first sequence keys.

2. The method of claim 1, wherein encrypting comprises encrypting each entry in the variation table with the corresponding assigned one of the first sequence keys.

3. The method of claim 1, wherein encrypting comprises encrypting each entry in the variation table with a derivative of the corresponding assigned one of the first sequence keys.

4. The method of claim 1, further comprising assigning one of the first sequence keys to media players based on an error-correcting code.

5. The method of claim 1, wherein identifying the number of variations comprises determining content file variations from an inner code.

6. The method of claim 5, wherein the inner code comprises the inner code table with the variation table.

7. The method of claim 5, wherein the inner code comprises an error-correcting code.

8. The method of claim 1, further comprising indexing the first sequence keys into a variation key.

9. The method of claim 8, wherein encrypting each entry in the variation table comprises encrypting the one of the content file variations with the variation key.

10. The method of claim 9, further comprising decrypting one of the content file variations with the variation key.

11. A computer program product for tracing distribution of protected files, comprising:
    a computer readable storage medium having computer readable program code embodied therewith, the computer readable program code comprising:
    computer readable program code configured to identify one of a plurality of first sequence numbers and one of a plurality of first sequence keys for a content file;
    computer readable program code configured to identify a number of first content file variations in a content file;
    computer readable program code configured to detect watermarks in the content file for use in determining the first content file variations;
    computer readable program code configured to assign one or more first sequence keys and one or more first sequence numbers to each of the first content file variations;
    computer readable program code configured to generate a variation table having a plurality of entries, the variation table for mapping the first sequence keys to the first content file variations;
    computer readable program code configured to create an inner code table with entries for each of the critical segments;
    computer readable program code configured to map a variation number in addition to a variation key for each entry in the inner code table;
    computer readable program code configured to encrypt the variation number and store the variation number in the variation table;
    wherein each entry in the variation table contains a variation corresponding to at least one of the first sequence keys; and
    computer readable program code configured to encrypt each entry in the variation table with a value associated with the corresponding assigned one of the first sequence keys.

12. The computer program product of claim 11, wherein the computer readable program code configured to encrypt comprises a computer readable program code configured to encrypt each entry in the variation table with the corresponding one of the first sequence keys.

13. The computer program product of claim 11, wherein the computer readable program code configured to encrypt comprises a computer readable program code configured to encrypt each entry in the variation table with a derivative of the corresponding one of the first sequence keys.

14. The computer program product of claim 11, further comprising a computer readable program code configured to assign the first sequence keys to media players based on an error-correcting code.

15. The computer program product of claim 11, wherein the computer readable program code configured to identify the number of first content file variations comprises a computer readable program code for determining first content file variations from an inner code.

16. The computer program product of claim 15, wherein the inner code comprises the inner code table with the variation table.

17. The computer program product of claim 15, wherein the inner code comprises an error-correcting code.

18. The computer program product of claim 11, further comprising a computer readable program code configured to index the first sequence keys into a variation key.

19. The computer program product of claim 18, wherein the computer readable program code for encrypting each entry in the variation table comprises a computer readable program code for encrypting one of the first content file variations with the variation key.

20. A processor-implemented system for assigning sequence keys to a content file, to enable tracing, comprising:
   a processor for executing the following modules:
   a module for identifying one of a plurality of first sequence numbers and one of a plurality of first sequence keys for the content file;
   a module for identifying a plurality of first content file variations for the content file;
   a module for randomly selecting a sequence column;
   a module for assigning one or more first sequence keys and one or more first sequence numbers in the sequence column to each first content file variation, wherein the first sequence keys are grouped in a random manner with one of the first content file variations;
   a module for generating a variation table having a plurality of entries, the variation table for mapping the first sequence keys to the first content file variations,
      wherein each entry in the variation table contains a variation corresponding to at least one of the first sequence keys;
   a module for encrypting a first variation number and storing the first variation number in the variation table;
   a module for identifying a critical segment which contains some of the first content file variations; and
   a module for encrypting each entry in the variation table with a value associated with the corresponding one of the first sequence keys.

* * * * *